United States Patent Office
3,052,570
Patented Sept. 4, 1962

3,052,570
TEXTILE FINISHING RESIN, WRINKLE RESISTANT CELLULOSE TEXTILE, PROCESSES OF MAKING RESIN AND TREATED TEXTILE
Raymond Polansky, Middlesex, and Joseph R. Anghinetti, Plainfield, N.J., assignors to American Cyanamid Company, New York, N.Y., a corporation of Maine
No Drawing. Filed Dec. 23, 1959, Ser. No. 861,461
12 Claims. (Cl. 117—139.4)

This invention relates to a novel water-soluble resin, to resin blends containing said novel resin, to processes for preparing the same and to their use in the finishing of textile materials.

More particularly, the present invention relates to novel water-soluble potentially thermosetting melamine-formaldehyde resins, blends comprising the same with dimethylol ethylene urea, to the processes for preparing the same, to processes for finishing textile materials therewith and to the textile materials so finished.

Polymethylol melamines, which term is intended to include their alkylated and, in particular their methylated, derivatives, have been prepared heretofore and are well-known as textile finishing resins whereby wrinkle resistance and shrinkage control are imparted to cellulose textile materials. Also well known as a textile finish is dimethylol ethylene urea which material also imparts wrinkle resistance and shrinkage control to cellulose containing fabrics.

One disadvantage of both of these well known textile finishing resins is their tendency to retain chlorine when fabrics finished therewith are subjected to chlorine bleaching. In the case of polymethylol melamines, the harmful effect is exhibited primarily in the form of yellowing of the fabric. In the case of dimethylol ethylene urea, the harmful effect is exhibited particularly in loss of tensile strength when the fabric is scorched subsequent to chlorine bleaching.

Attempts have been made heretofore in the prior art to produce formulations containing melamine-formaldehyde and ethylene urea formaldehyde resin in which the principal undesirable tendencies of each with respect to chlorine bleaching is minimized. As witness to such efforts, U.S. Patents 2,690,404 and 2,804,402 may be cited. Mixtures such as are described in the above referred to patents are not without limitation. Thus, for example, even within the optimum conditions defined in these references, fabrics treated therewith are subject to yellowing due to chlorine retention upon repeated and extended washing due to the melamine component and the tensile strength likewise suffers when fabrics finished with such compositions are scorched after repeated laundering in the presence of chlorinated bleach due to the presence of the ethylene urea formaldehyde condensate component of the mixtures.

More recently improved melamine formaldehyde-cyclic urea and in particular, ethylene urea formaldehyde resin blends, have been perfected. These resins are an advance in the art principally because of the melamine components in such blends which are specially prepared, and may be characterized as being substantially fully etherified substantially fully methylolated melamine resins which are infinitely water-soluble. For the most part, the disadvantages associated with chlorine retention during laundering are minimized by employing resinous compositions of the type generally referred to above. Such resins are described in co-pending application, Serial No. 732,815, filed May 5, 1958, now abandoned.

While such resins as are prepared in accordance with the above identified co-pending application are highly satisfactory, improvement in properties adversely effected by retained chlorine from chlorine bleaching such as tensile strength and yellowing is still most desirable. In general, finishes resulting from the use of such resins are resistant to home laundering and to chlorine damage until it is degraded under acid conditions. Acid conditions occur during the souring stage of commercial laundering. Souring is employed by commercial laundries principally to remove excess alkali, to impart antiseptic properties in some instances and to develop the blueness of certain blueing agents. Although souring should be conducted at a pH of 5 or above, many laundries sour at pH's as low as 3.5. From the viewpoint of the finisher of resin treated goods, as well as the customer, it is unfortunate that many commercial laundries customarily sour at such a low pH. Such low pH's result from the use of very acid souring agents such as hydrofluoric acid and an extra amount of a silico-fluoride or an accidental rise in the temperature of souring. Any of these and combinations thereof are sufficient to degrade the resinous finishes customarily used on "wash and wear" fabrics. These finishes are obtained with melamine-formaldehyde, urea-formaldehyde, ethylene urea-formaldehyde and other aminoplast resin finishes, including the melamine-formaldehyde resin blends of the above referred to co-pending application.

For "wash and wear" or "minimum-care" white cottons, textile finishing agents should give the fabric a finish which produces good wrinkle recovery and shape-holding properties, cause no acid damage as a result of hypochlorite bleaching and should be durable to laundering. The term "wash and wear" has been defined as applicable to a garment that will drip-dry without wrinkles and can be worn without ironing, although fastidious wearers may insist on some "touch-up" ironing.

Accordingly, it is an object of the present invention to provide a novel melamine-formaldehyde resin which when employed in combination with dimethylol ethylene urea is capable of imparting a finish having unusual resistance to acid degradation normally encountered under commercial laundering conditions.

It is a further object of the present invention to provide compositions containing the novel melamine-formaldehyde resin of this invention and dimethylol ethylene urea in which the components are present in certain fixed relative mole ratios.

Another object of the present invention is to provide a process for the preparation of such resin blends.

A further object of the present invention is to provide a novel infinitely soluble essentially monomeric melamine-formaldehyde resin.

It is a still further object of the present invention to provide a method for finishing cellulose containing textile material with the novel blends of this invention which are resistant to the degradative effects of acid normally encountered under commercial laundering conditions.

These and other objects and advantages of the present invention will become more apparent from the detailed description set forth hereinbelow.

According to the present invention, a process is provided for preparing a water-soluble substantially fully etherified substantially fully methylolated melamine which comprises reacting relative mole ratios of one mole of a substantially monomeric substantially fully methylolated melamine with from between 2 and 8 moles of diethylene glycol and 10 to 18 moles of methanol under acidic conditions.

Additionally, the present invention relates to a process for preparing such a water-soluble etherified methylolated melamine in combination with dimethylol ethylene urea in which the blend may be prepared in either what may be termed a "two-kettle" process in which the melamine component is isolated before being combined with the ethylene urea or in a "one-kettle" process in which the melamine component is not isolated prior to the formation of the ethylene urea-formaldehyde condensate. Whether the two-kettle or a one-kettle process is employed, the novel melamine formaldehyde condensate is for most purposes substantially the same.

In accordance with the present invention and for purposes of clarity, the following terms have the following meanings.

By the expression "substantially fully methylolated melamine" as it is used herein, it is meant a product which contains a minimum of 5.8 moles of formaldehyde per mole of melamine and preferably up to 6 combined moles of formaldehyde per mole of melamine.

By the expression "substantially fully etherified" as it is employed herein, it is meant that at least 5.6 of the available methylol groups on the melamine have been reacted with a lower alkyl alcohol containing 1 to 4 carbon atoms including methanol, ethanol, the propyl alcohols and the butyl alcohols, although methanol is greatly preferred, and diethylene glycol. In this connection the etherifying groups are preferably principally methyl, however one mole of the melamine condensate should contain a minimum of about 0.5 moles of ethoxyethyl groups and may contain to about 4.0 moles of such groups, the balance being methyl. Thus, from between about 5.5 and 2 methyl groups per molecule of substantially fully methylolated resin are contemplated.

By the expression "excellent stability" and similar expressions as they are employed herein, it is meant stability in aqueous solution in all concentrations for at least 12 weeks at 12 and 37° C.

By the expression "infinite solubility" as it and similar expressions are employed herein, it is meant that the present resin composition is readily and easily soluble and dilutable in water in all proportions and that solutions containing the resin in all proportions remain clear.

By the expression "cellulosic material" as that term is employed herein, it is meant fibers, yarns, filaments, formed fabrics whether knitted, woven or non-woven, felted or otherwise formed containing at least 50% of cellulosic fiber as, for example, cotton, rayon, jute, linen, flax, and other cellulosic materials. These cellulosic textile materials may be employed in combination with other non-cellulosic materials as, for example, they may be blended with other natural and synthetic fibers as for example, wool, silk, nylon, acrylic and polyester fibers.

The expression "28 inches of mercury" and similar expressions as they are employed herein, refer to commercial dial gauge readings. In principle, these readings are obtained as follows. A hollow tube is connected from an opening in the container, the vacuum in which it is to be measured, to the upper end of a vertical glass tube, the lower end of which is in a pool of mercury. As a vacuum pump exhausts the air from the container and the glass tube, atmospheric pressure forces the mercury up the said tube. The height to which the mercury rises is the measure of the vacuum in the container, which in the present invention has been read in inches.

In the "two-kettle" process, the melamine-formaldehyde condensate is isolated, thereby eliminating the excess formaldehyde, and the etherification is carried out in a second operation using the isolated methylol melamine. Of course, either dimethylol ethylene urea or formaldehyde and ethylene urea may be added to the etherified methylol melamine. This process is more expensive than the "one-kettle" process, and for this reason, less attractive.

According to the preferred "one-kettle" procedure of the present invention, melamine and para-formaldehyde in mole ratios of from 1:6.5 to 1:20, preferably 1:8 to 1:12 (expressed as monomeric formaldehyde) are heated in diethylene glycol, methanol or a mixture of the two at a pH between 7.0 and 10.0, preferably between 8.0 and 10.0, and at a temperature between 40° and 110° C., preferably between 50° and 70° C., until the reaction is complete as determined by analysis for unreacted formaldehyde. The amount of alcohol used should be at least 6 moles per mole of melamine.

For the etherification step, sufficient amounts of the alcohols are added to make a total of between 10 and 20 moles, preferably between 12 and 18 moles, per mole of melamine. The amount of diethylene glycol used should be between 2 and 8 moles per mole of melamine, preferably between 4 and 8 moles. The difference between the moles of diethylene glycol and the total moles of alcohol represents the moles of methanol used. Therefore, from 2 to 18 moles of methanol per mole of melamine may be used and preferably 4 to 14 moles. The pH of the reaction mixture is adjusted to a value below 4.0, and preferably below 3.5, with a suitable acid such as sulfuric acid. The mixture is stirred at a temperature between 25° and 100° C., and preferably between 55° and 75° C., until complete solution is obtained. Between 5 and 60 minutes are usually required for the etherification.

After etherification, the pH of the reaction mixture is adjusted to between 8 and 10 with sodium hydroxide, potassium hydroxide, sodium carbonate or the like, the solution is concentrated in vacuo. The amount of free formaldehyde remaining in the residual syrup is dependent on the amount of para-formaldehyde used and the extent of the vacuum concentration.

After vacuum concentrating to remove some excess formaldehyde and alcohol, sufficient ethylene urea is added to react with the major portion of the free formaldehyde to give dimethylol ethylene urea. Thus, sufficient formaldehyde should be left after vacuum concentration to react with the ethylene urea or additional amounts of formaldehyde should be added so that dimethylol ethylene urea may be formed. The preferred amount of dimethylol ethylene urea is 1 mole per mole of melamine; therefore, 1 mole of ethylene urea should be added, although somewhat larger or smaller amounts may be used. Sufficient water may be added to give the desired solids content in the final product. After the addition of the ethylene urea, the temperature is maintained at 30° to 80° C., preferably between 50 and 70° C., until the reaction between ethylene urea and formaldehyde is complete, as determined by analysis for free formaldehyde. Sufficient water, if required, is then added to bring the solids content to the desired value of 50%. If necessary, the pH is adjusted to a value between 7 and 9 with any suitable alkaline material. Also the solution may be filtered. Although methanol is the preferred aliphatic monohydric alcohol and is employed in the above process description, other suitable alcohols may be used, such as ethanol, propanol or butanol, singly or in combination with each other or methanol.

Diethylene glycol gave superior results compared to those obtained with monoethyl ether of diethylene glycol, ethylene glycol or polyethylene glycol. Employing six moles of diethylene glycol per mole of melamine during manufacture resulted in a resin having better chlorine retention properties than resins prepared employing three moles. However, approximately 2 to 4 moles of combined methanol per mole of melamine is required to prevent gelation during the etherification step.

Nitric acid is the preferred acid for adjusting the pH to below 4 and preferably below 3.5 prior to the etherification, but other acids may be used, such as sulfuric, hydrochloric, phosphoric, oxalic and paratoluene sulfonic acids.

Although it is recommended that approximately 1.0 mole of ethylene urea per mole of melamine resin be used, the experimental evidence indicates that usages between 0.75 and 1.25 moles of ethylene urea may be used and a blend of good quality will result.

The novel resin blend of this invention may be applied to textile materials, preferably a formed cellulose containing fabric, with a suitable curing catalyst. The resinous composition and catalyst may be applied by any conventional technique, such as immersion, padding, spraying and the like and followed, where necessary, by squeezing, hydro-extraction or similar process, in order to affix the desired amount of resin solids onto the fabric.

The method of application should be such that from about 1 to about 25%, and in some instances higher amounts of the resinous product of this invention, based on the weight of the fabric, are deposited thereon. Within certain limits, the amount of resin applied depends upon the particular type of fabric being treated. Thus, when treating fabric consisting of fibrous cellulosic materials, the concentration of the order of from about 1 to 25%, and more preferably from 3 to 10% resin solids, based on the dry weight of the fabric, may be employed.

The catalyst utilized may be free acid, acid salts, alkanolamine salts and the like. The concentration of catalyst embdoyed may range from about 0.1 to about 25% or higher, based on the weight of the resin solids, depending upon the particular catalyst type employed. Thus, for example, from between about 0.1 and about 10% of a free acid, such as phosphoric, tartaric, oxalic or the like, may be employed, while in the case of ammonium chloride amounts of from between 0.5 and about 10% are used. In the case of amine salts, including alkanolamine salts, such as diethanolamine hydrochloride, from about 1.0 to about 10% are most useful, while with respect to salts such as magnesium chloride, aluminum chloride, zinc chloride and the like, amounts of between about 5 and 25% have been successfully employed. In all instances, the concentration of the catalyst is based on the weight of the resin solids employed.

Following the application of the resin and curing catalyst to the textile fabric, the material is subject to drying and curing operations to effect the properties of shrinkage control and wrinkle resistance. The drying and curing operation may be carried out in a single step or in separate steps. The temperatures at which the drying and curing operations are effective vary widely and are influenced to some extent by the type of catalyst employed. Normally, the range of temperature extends from about 180° F. to about 450° F. or even higher. Generally speaking, the time of the drying and/or curing operation is inversely proportional to the temperature employed, and of course is influenced by whether or not separate or combined drying and curing steps are employed.

Generally, when drying and curing is carried out in a combined operation, a time of from about 1 minute to about 10 minutes may be employed at temperatures from about 450 to 250° F., respectively. When the fabric has been dried preliminary to curing, curing times of the order of 5 minutes to about ¼ minute at a temperature of from between 250 and 450° F., respectively, have been successfully employed.

In order to illustrate the present invention, the following examples are given primarily by way of illustration. No specific details or enumerations described therein should be construed as limitations on the present invention except insofar as they appear in the appended claims. All parts and percentages are by weight unless otherwise specifically designated.

EXAMPLE 1

To a charge of 636 parts (6.0 moles) of diethylene glycol and 4.8 parts of 17% sodium hydroxide (pH 11.0), there were added 330 parts (10.0 moles) of para-formaldehyde, and after 15 minutes at 60° C. (pH 10.5) there were added 126 parts (1.0 mole) of melamine. The charge was heated to 100° C. over approximately 30 minutes (pH 8.6) and then held at 100° C. for one hour (pH 7.4).

After cooling to 70° C., 256 parts (8.0 moles) of methanol were added, followed at 60° C. by 14.7 parts of 70% nitric acid. After 35 minutes at 65° C., the pH was 2.3 (after first five minutes, pH was 3.2).

When the pH had been adjusted to 10.0 with approximately 40 parts of 17% sodium hydroxide, the charge was concentrated in vacuo (equivalent to 27–29″ of mercury) to an internal temperature of 80° C. and a Stormer viscosity of 420 cps. The concentrated charge weighed 1,038 parts, contained 87.5% "oven solids," and 7.3% free formaldehyde, and had a pH of 8.35.

After adding 215 parts (1.0 mole) of 40% aqueous suspension of ethylene urea and heating at 60° C. for 30 minutes (pH 8.7), the batch was diluted with 719 parts of water (calculated to yield 1,950 parts of resin solution containing 50% "oven solids").

The final product was analyzed as follows:

Oven solids (2 hours at 75° C.) _____ percent __ 50.9
Free formaldehyde _____ do ____ 1.7
pH _____ 9.0
Viscosity _____ cps __ 13.5

EXAMPLE 2

Three batches of resin were prepared by the following general procedure:

A charge containing 192 parts (6.0 moles) of methanol, 3.5 parts of 17% sodium hydroxide and 247.5 parts (7.5 moles) of 91% para-formaldehyde was heated to 45° C. and 94.5 parts (0.75 mole) of melamine were added. After heating at the reflux for two hours and cooling, there were added the number of parts of a second hydroxy compound indicated in Table I and 8.5 parts of 70% nitric acid. The charge was then held at 40° C. for 0.5 hour whereupon 192 parts (6.0 moles) of methanol were added. The heating at 40° C. was then continued for 1.0–1.75 hours until a complete solution was obtained. When the pH had been adjusted to 9.5–10.0 with sodium hydroxide, the charge was concentrated to an internal temperature of 80° C. with a vacuum equivalent to 28–29″ of mercury. The amount of free formaldehyde was determined.

To the batch there were added 143 g. (0.65 mole) of 40% aqueous solution of ethylene urea, and the charge was held at 60° C. for 0.5 hour. After cooling, the batch was filtered, and the final product was analyzed for total solids (by drying in the oven at 75° C. for two hours) and for free formaldehyde. The "percent solids" was also calculated.

Table I

| | A | B | C |
|---|---|---|---|
| Hydroxy compound | Monoethylene ether of diethylene glycol. | Ethylene glycol. | Diethylene glycol. |
| Parts | 402 | 180 | 318. |
| Moles | 3.0 | 3.0 | 3.0. |
| Free formaldehyde, percent: | | | |
| Before ethylene urea. | 7.0 | | 9.4. |
| After ethylene urea. | 2.7 | 2.6 | 3.1. |
| Percent solids (by analysis). | 52.5 | 69.0 | 80.0. |
| Percent solids [1] (by calculation). | 44.3 | 60.7 | 49.2. |

[1] As resin MEL/EU a substantially fully methylolated melamine formaldehyde resin and dimethylol ethylene urea in a 1:1 molar blend.

In the examples, reference has been made to "solids by analysis" or "solids by drying" and "solids by calculation." In the first two cases, the solids were determined by drying a sample of resin at 75° C. until no further loss in weight was found. This is a good procedure for solids when all diluents, such as water and methanol, are volatile at 75° C. However, when a diluent which is non-volatile at 75° C. is present, the results are misleading since the non-volatile diluent will remain with the solids to give a high result for solids. This is the case with diethylene glycol which boils at 245° C. In order to arrive at a more accurate solids value, calculations were made for the amount of resin that could be expected from the amount of melamine used. Since the chemical formula or structure of the melamine resin of this case varies, a similar known melamine resin was used. Table II demonstrates the effect on "solids by analysis" and "solids by calculation" when the amount of diethylene glycol used is doubled.

EXAMPLE 3

Two batches were prepared by the following general procedure:

A charge containing 153 parts (0.5 mole) of a water-soluble hexamethylol melamine and the number of parts of diethylene glycol indicated in Table II and 2.75 parts of concentrated sulfuric acid was prepared. After raising the temperature to 45° C. over 0.25 hour, the temperature was maintained at 45° C. for the length of time indicated in Table II. Batch A became "gummy."

At this point, 96 parts (3.0 moles) of methanol were added to both batches and the heating at 45° C. was continued for the length of time indicated in Table II. When the pH had been adjusted to 9.0 with 50% sodium hydroxide, the charge was filtered.

The "percent solids" in the final product were determined by drying a sample in the oven at 75° C. for two hours. The "percent solids as hemamethyoxymethyl melamine" was also calculated. These values are shown in Table II.

Table II

|  | A | B |
| --- | --- | --- |
| Diethylene glycol, parts | 159 | 318 |
| Diethylene glycol/melamine ratio, moles | 3:1 | 6:1 |
| First heating period, hours | 0.25 | 0.5 |
| Second heating period, hours | 1.0 | 0.75 |
| Percent solids (by analysis) | 46.5 | 70.5 |
| Percent solids [1] (calculated) | 47.3 | 34.1 |

[1] As hexamethoxymethyl melamine.

EXAMPLE 4

The general procedure for a series of batches is described as follows:

A charge of 477 parts (4.5 moles) of diethylene glycol, 3.5 parts of 17% sodium hydroxide and the number of parts of 91% para-formaldehyde indicated in Table III was heated at 60° C. for 10 minutes, whereupon 94.5 parts (0.75 mole) of melamine were added. After a 1-hour period at 100° C. with subsequent cooling to 50° C., 192 parts (6.0 moles) of methanol and 8.5 parts of 70% nitric acid were added and the temperature was maintained at 40° C. for 1.25 hours. Sample A was adjusted to a pH of 9–10 with alkali. To the other batches, 4.2 parts of 70% nitric acid was added, and stirring at 40° C. continued until the batch was opalescent (time varied from ¼ to 1 hour). After adjustment of the pH to 9.5–10.0 with sodium hydroxide, the slightly turbid charge was concentrated in vacuo equivalent to 28–29″ of mercury until an internal temperature of 80° C. was reached. (A, B, C–1, D–1, E–1 in Table III.)

To 300 parts of the concentrated batches C–1, D–1, and E–1 equivalent to aproximately 0.3 mole of melamine, there were added 60 parts (0.275 mole) of 40% aqueous suspension of ethylene urea, and the temperature was maintained at 60° C. for 0.5 hour. The final product was analyzed for solids (by drying in the oven at 75° C. for two hours) and for free formaldehyde. (C–2, D–2, E–2 in Table III.)

Table III

| Ratio HCHO to melamine | Para-formaldehyde | | Ethylene urea used | Final product | |
| --- | --- | --- | --- | --- | --- |
| | Parts | Moles | | Percent solids | Percent free HCHO |
| A | 6.5:1 | 147.6 | 4.88 | No | 82.6 | 3.2 |
| B | 7:1 | 173 | 5.25 | No | 83.5 | 4.2 |
| C–1 | 8:1 | 197.6 | 6.0 | No | 78.7 | 5.1 |
| C–2 | 8:1 | | | Yes | 82.0 | 1.3 |
| D–1 | 9:1 | 222 | 6.75 | No | 82.0 | 5.7 |
| D–2 | 9:1 | | | Yes | 82.0 | 1.8 |
| E–1 | 10:1 | 247.5 | 7.5 | No | 85.5 | 7.2 |
| E–2 | 10:1 | | | Yes | 82.6 | 2.7 |

EXAMPLE 5

Three resin preparations were made by adding the amount of 40% aqueous solution of ethylene urea shown in Table IV to 100 parts (equivalent to 0.093 mole of melamine) of the product of Example 4–E–1 and heating the reaction mixture at 60° C. for 0.5 hour.

Table IV

|  | A | B | C |
| --- | --- | --- | --- |
| Mole ratio, ethylene urea/melamine | 1/1 | 1.25/1 | 0.75/1 |
| Parts of 40% ethylene urea | 20.0 | 24.9 | 15 |
| Moles of ethylene urea | 0.093 | 0.116 | 0.07 |
| Percent resin solids in product | 78.0 | 76.4 | 79.6 |

EXAMPLE 6

The product of Example 1 was applied to cotton fabric and the treated fabric was tested.

A pad bath was prepared containing 7.5% solids (by analysis) of the resin and 12% of magnesium chloride on the weight of the resin solids. 6% resin solids on the weight of the fabric were applied to 80 x 80 cotton percale using an 80% wet pick-up. The fabrics were dried at 225° F. for 2 minutes and cured at 350° F. for 1.5 minutes.

A corresponding 6% application of resin MEL/EU was made under the same conditions for comparative purposes.

The wrinkle recovery was measured on a Monsanto wrinkle recovery tester following the tentative test method 66–1956 described on page 158 of the 1957 Technical Manual and Year Book of the American Association of Textile Chemists and Colorists, volume 33.

The tear strength was measured by the standard Elmendorf test. The tensile strength was measured on a Scott tester according to ASTM standards.

The chlorine retention, tensile strength test was measured by tentative test method 69–1952 described on page 121 of the above reference.

The yellowness index was calculated by the equation:

$$\text{Yellowness index} = 70\left(1 - \frac{R_{455}}{R_{577}}\right)$$

where $R_{455}$ and $R_{577}$ are reflectance values obtained on a recording spectrophotometer, using a magnesium carbonate block as a reference standard, at the wavelengths of 455 millimicrons and 577 millimicrons, respectively.

The soiling test was carried out as follows: The treated fabrics were washed in a Laundromat washer at 140° F. with 7 g. of neutral soap and 0.5 g. of a synthetic soil in the washer. A 6-lb. load of cloth was used with a minimum of about 20 pieces of fabric (9″ x 18″). After the samples were tumble dried, the reflectance of the fabric was measured on a spectrophotometer using light of 577 millimicrons in wavelength.

The washes at 212° F. were carried out by the test method 14–1953 described on page 123 of the above reference.

The "sour washes" were done in a Najort washer using 75 liters of water, 11 g. of a synthetic detergent, 0.01% available chlorine, 6-lb. load of cloth and a wash cycle of 20 minutes at 160° F. This was followed by a clear rinse of 10 minutes at 140° F., a second clear rinse of 5 minutes at 120° F., and a final sour rinse of 5 minutes at 120° F. with 4.5 g. of zinc silicofluoride in the rinse water. The cloth was tumble dried before the yellowness test and pressed dry before the wrinkle recovery and strength tests.

In the "oxalic sour and bleach," the fabric was agitated in a 2% aqueous solution of oxalic acid at 100° F. with a 40:1 liquor-to-cloth ratio for 10 minutes. Following a clear rinse, the fabric was agitated in water containing 0.15% of available chlorine at 100° F. for 10 minutes. After a clear rinse, the fabric was dried.

The scorch operation is described in tentative test method 69-1952, page 121 of the 1957 Technical Manual and Year Book of the American Association of Textile Chemists and Colorists, volume 33.

The results of the tests are shown in Table V.

Table V

|  | Untreated fabric | Product of Example 1 | MEL/EU blend |
|---|---|---|---|
| Grab tensile strength (W+F, lb.): |  |  |  |
| Initial | 101 | 69 | 59 |
| After 5 sour washes | 96 | 69 | 66 |
| After 5 sour washes and scorch | 98 | 63 | 54 |
| Chlorine retention, tensile strength, lb.: |  |  |  |
| Initial: |  |  |  |
| Before clorine | 98 | 65 | 58 |
| After clorine | 98 | 65 | 59 |
| Percent loss | 0 | 0 | 0 |
| After 5 Washes (212°F.): |  |  |  |
| Before chlorine | 99 | 68 | 62 |
| After chlorine | 98 | 62 | 57 |
| Percent loss | 1 | 9 | 8 |
| Yellowing index: |  |  |  |
| Initial | 1.5 | 3.2 | 2.6 |
| After 5 sour washes | 1.2 | 2.4 | 3.9 |
| After 10 sour washes | 0.5 | 3.0 | 5.2 |
| After oxalic sour and bleach | 0.6 | 3.3 | 5.4 |

[1] MEL/EU blend = A substantially fully etherified substantially fully methylolated melamine and dimethylol ethylene urea blend in 1:1 mole ratio.

EXAMPLE 7

The products of Example 2 were applied to cotton fabric and the treated fabrics were tested for wrinkle recovery and yellowing due to chlorine retention.

Pad baths were prepared containing 6.25% solids (by analysis) of the resins, and a second set was also prepared containing 6.25% solids by calculation based on resin MEL/EU. Both sets of pad baths contained 12% of magnesium chloride on the weight of the resin solids. 5% resin solids on the weight of the fabric were applied to 80 x 80 cotton percale using an 80% wet pick-up. The fabrics were dried for 2 minutes at 225° F. and cured for 2 minutes at 330° F.

The tests and washes were carried out as described in Example 6. The "oxalic acid and bleach" were also carried out as in Example 6 with the following exceptions: The treatment with aqueous oxalic solution at 100° F. was for 20 minutes and the treatment with chlorine solution (sodium hypochlorite) at 120° F. for 20 minutes.

In Table VI are shown the results of the tests run on the fabrics treated as described above.

Table VI

|  | Yellowness indices | | |
|---|---|---|---|
|  | Initial | 5 sour washes | Oxalic sour and bleach |
| Equal resin solids by analysis: |  |  |  |
| Example A | 2.0 | 2.2 | 7.6 |
| Example B | 1.9 | 1.8 | 7.6 |
| Example C | 2.0 | 1.8 | 5.7 |
| Equal resin solids by calculation: |  |  |  |
| Example A | 1.8 | 2.2 | 8.3 |
| Example B | 1.9 | 2.6 | 8.6 |
| Example C | 1.8 | 2.2 | 8.2 |
| MEL/EU resin | 2.2 | 3.3 | 11.1 |
| Untreated fabric | 1.5 | 0.3 | 1.2 |

These results show that on an equal MEL/EU basis, all three resins produced similar wrinkle recoveries, when compared with MEL/EU with slightly lower yellowing due to chlorine retention.

On an equal "oven solids" basis, the resin etherified with diethylene glycol yellowed to a significantly lower degree than the resins etherified with monoethyl ether of ethylene glycol or ethylene glycol, although the wrinkle recoveries changed but little.

EXAMPLE 8

The products of Example 3 were applied to cotton fabric and the treated fabrics were tested for wrinkle recovery and yellowing due to chlorine retention.

Pad baths were prepared containing 6.25% and 12.5% resin solids (by analysis), and 6.25% resin solids (by calculation as hexamethoxymethyl melamine). The baths also contained 12% magnesium chloride on the weight of the resin solids. 5% and 10% resin solids on the weight of the fabric were applied to 80 x 80 cotton percale using an 80% wet pick-up. The fabrics were dried for 2 minutes at 225° F. and cured for 2 minutes at 330° F.

The tests and washes were carried out as described in Example 6. In the "oxalic sour and bleach," carried out as described, in Example 6, the treatment with oxalic acid was for 20 minutes at 100° F. and the treatment with chlorine bleach was for 20 minutes at 150° F. The results of the tests are shown in Table VII.

These results show that the resin prepared with 6 moles of diethylene glycol per mole of melamine was superior in yellowing due to chlorine retention when compared with the resin made with 3 moles of diethylene glycol per mole of melamine. It was also superior to resins MEL and MEL/EU.

Table VII

|  | Yellowness indices | | |
|---|---|---|---|
|  | Initial | 5 sour washes | Oxalic sour and bleach |
| Untreated fabric | 1.4 | 0.4 |  |
| 5% resin solids by calculation: |  |  |  |
| Example 3-A | 2.3 | 2.3 |  |
| Example 3-B | 2.1 | 1.5 |  |
| 5% resin MEL/EU | 1.9 | 2.7 |  |
| 5% resin MEL [1] | 1.9 | 3.5 |  |
| 10% resin solids by calculation: |  |  |  |
| Example 3-A | 2.3 | 2.3 |  |
| Example 3-B | 2.6 | 1.7 |  |
| 10% resin MEL/EU | 1.9 | 2.8 |  |
| 10% resin MEL [1] | 2.1 | 2.8 |  |
| Untreated fabric | 1.4 | 0.6 | 1.1 |
| 5% resin solids by analysis: |  |  |  |
| Example 3-A | 2.3 | 2.7 | 10.8 |
| Example 3-B | 2.4 | 1.6 | 4.5 |
| 5% resin MEL/EU | 2.1 | 3.5 | 10.9 |
| 5% resin MEL [1] | 1.9 | 3.9 | 13.7 |

[1] Substantially fully methylated, substantially fully methylolated melamine.

EXAMPLE 9

The products of Example 4 were applied to cotton fabric and the treated fabrics were tested for wrinkle recovery, yellowing due to chlorine retention and soiling during laundering.

Pad baths were prepared containing 6.25% solids (by analysis) of the resins and 12% magnesium chloride on the weight of the resin solids. 5% resin solids on the weight of the fabric were applied to 80 x 80 cotton percale using an 80% wet pick-up. The fabrics were dried for 2 minutes at 225° F. and cured for 2 minutes at 330° F.

The tests, washes and bleaches were carried out as described in Example 8. The tests are shown in Table VIII.

Table VIII

| | Yellowness indices | | | Soiling percent reflectance |
|---|---|---|---|---|
| | Initial | 10 sour washes | Oxalic sour and bleach | |
| Example 4-A | 2.0 | 9.9 | 14.6 | 100.0 |
| Example 4-B | 1.8 | 8.6 | 11.7 | 100.0 |
| Example 4-C-1 | 1.9 | 7.4 | 10.3 | 99.3 |
| Example 4-C-2 | 1.9 | 6.9 | 9.5 | 100.0 |
| Example 4-D-1 | 1.7 | 6.7 | 8.6 | 100.0 |
| Example 4-D-2 | 1.9 | 6.2 | 7.9 | 99.9 |
| Example 4-E-1 | 1.8 | 5.8 | 7.0 | 100.0 |
| Example 4-E-2 | 1.9 | 5.6 | 6.0 | 100.0 |
| Resin MEL/EU | 1.8 | 9.6 | 13.2 | 98.0 |
| Resin MEL [1] | 2.0 | 9.9 | 14.6 | 98.1 |
| Untreated fabric | 1.2 | 0.4 | 1.0 | 99.8 |

[1] A fully etherified fully methylolated melamine.

These results show that the yellowing due to chlorine retention decreased as the molar ratio of formaldehyde to melamine was increased in the methylolation step.

At any given formaldehyde/melamine ratio, the resin containing a mole of dimethylol ethylene urea per mole of melamine yellowed less than the resin containing no dimethylol ethylene urea and also produced a higher wrinkle recovery.

The product from Example 3-E-2, having a formaldehyde/melamine ratio of 10:1 and equal moles of methylolated melamine and dimethylol ethylene urea, was equal to resin MEL/EU in wrinkle recovery and much superior in yellowing due to chlorine retention. It was also superior in soiling during laundering.

EXAMPLE 10

The products of Example 5 were applied to cotton fabric and the treated fabrics were tested for wrinkle recovery and yellowing due to chlorine retention.

Pad baths were prepared containing 7.5% resin solids and 12% of magnesium chloride on the weight of the resin solids in the bath. 6% resin solids on the weight of the fabric were applied to 80 x 80 cotton percale using an 80% wet pick-up. The fabrics were dried at 225° F. for 2 minutes and cured for 2 minutes at 330° F.

The tests were carried out as described in Example 6.

The results are shown below in Table IX.

Table IX

| Example | Wrinkle recovery total in degrees initial | Yellowness indices | |
|---|---|---|---|
| | | Initial | Oxalic sour and bleach |
| 5-A | 247 | 2.4 | 5.3 |
| 5-B | 246 | 2.6 | 4.9 |
| 5-C | 247 | 2.2 | 5.1 |
| 5-A [1] | 251 | 2.6 | 4.9 |
| Resin MEL/EU | 256 | 2.1 | 10.0 |

[1] Resin solids based on oven analysis of 82.6%.

These results indicate that changing the molar ratio of dimethylol ethylene urea/melamine from 0.75/1 to 1.25/1 causes no significant change in the degree of yellowing caused by chlorine bleaching or in initial wrinkle recovery.

The resinous composition of the present invention may be employed with other textile finishing resins, either thermosetting or thermoplastic, to improve the durability of such finishes or to modify the hand or other characteristics of the finished fabric. Thus, for example, the resinous product of this invention may be employed with urea-formaldehyde resins, various other cyclic ureas, as for example, 1,2-propylene urea-formaldehyde resins, 1,3-propylene urea-formaldehyde resins, guanamine-formaldehyde resins and their alkylated derivatives. In addition, epoxide resins such as are disclosed in U.S. Patent 2,730,427 and 2,752,269. Further, urons such as are disclosed in U.S. Patent 2,373,135 and triazones such as are described in U.S. Patent 2,304,629 may be employed therewith. Among the thermoplastic resins which may be mentioned are homopolymers and copolymers of these or their equivalents with styrenes, including ring and chain substituted styrenes, acrylonitrile, polyvinyl chloride, and the like. In addition, the resinous mixture of this invention may be employed with softeners, stiffeners, lubricants, dicyanamide and other conventional treating bath components, where compatible.

We claim:

1. A composition of matter containing a water-soluble blend of resins comprising a water-soluble substantially fully etherified substantially fully methylolated melamine and dimethylol ethylene urea, said melamine resin and said dimethylol ethylene urea being present in relative mole ratios of from between 1:0.75 and 1:1.25 respectively, said melamine resin being prepared by reacting relative mole ratios of 1 mole of a substantially monomeric substantially fully methylolated melamine with from between about 2 and about 8 moles of diethylene glycol and about 2 to about 18 moles of methanol under acidic conditions.

2. A composition of matter containing a water-soluble blend of resins comprising a water-soluble substantially fully etherified substantially fully methylolated melamine and dimethylol ethylene urea, said melamine resin and said dimethylol ethylene urea being present in relative mole ratios of from between 1:0.75 and 1:1.25 respectively, said melamine resin being prepared by reacting relative mole ratios of 1 mole of a substantially monomeric substantially fully methylolated melamine with from between about 4 and about 8 moles of diethylene glycol and about 4 to about 14 moles of methanol under acidic conditions.

3. An infinitely water-soluble, essentially monomeric substantially fully etherified, substantially fully methylolated melamine resin, in which the etherifying groups are constituted by between about 0.5 to 4 moles of ethoxyethyl groups and from between about 5.5 and 2 moles of methyl groups.

4. A process for preparing a water-soluble substantially fully etherified substantially fully methylolated melamine, which comprises reacting relative mole ratios of 1 mole of a substantially monomeric substantially fully methylolated melamine with from between 2 and 8 moles of diethylene glycol and 2 to 18 moles of methanol under acidic conditions.

5. A process according to claim 4 in which from 4-8 moles of diethylene glycol and 4 to 14 moles of methanol are employed.

6. A process for preparing a water-soluble resin blend containing a substantially fully etherified substantially fully methylolated melamine and dimethylol ethylene urea which comprises reacting relative mole ratios of 1 mole of a substantially monomeric substantially fully methylolated melamine with from between about 2 and about 8 moles of diethylene glycol and about 2 to about 18 moles of methanol under acidic conditions and thereafter blending said melamine resin with said dimethylol ethylene urea.

7. A process according to claim 6 in which the melamine resin and the dimethylol ethylene urea are present in the blend in relative mole ratios of from between 1:0.75 to 1:1.25 respectively.

8. A process according to claim 6 in which from between 4 and 8 moles of diethylene glycol and from between 4 and 14 moles of methanol are employed.

9. A process according to claim 6 in which the melamine resin and dimethylol ethylene urea are present in relative mole ratios of 1:1.

10. A process for treating cellulose containing textile material whereby a wrinkle resistant finish resistant to yellowing due to chlorine bleaching after acid treatment is obtained which comprises applying to said material from between 1 and 25% based on the dry weight of the material of a water-soluble finishing composition comprising a water-soluble substantially fully etherified substantially fully methylolated melamine and dimethylol ethylene urea, said melamine component being one in which the etherifying groups are constituted by from between about 0.5 to 4 moles of ethoxyethyl groups and from between about 5.5 and 2 moles of methyl groups, said melamine component and said dimethylol ethylene urea being present in relative mole ratios of 1:0.75 to 1:1.25, respectively, and thereafter curing said resin blend in the presence of an accelerator by the action of heat.

11. A process for treating cellulose containing textile material whereby a wrinkle resistant finish resistant to yellowing due to chlorine bleaching after acid treatment is obtained which comprises applying to said material from between 1 and 25% based on the dry weight of the material of a water-soluble finishing composition comprising a water-soluble substantially fully etherified substantially fully methylolated melamine and dimethylol ethylene urea, said melamine component being one in which the etherifying groups are constituted by from between about 0.5 to 4 moles of ethoxyethyl groups and from between about 5.5 and 2 moles of methyl groups, said melamine component and said dimethylol ethylene urea being present in relative mole ratios of 1:1, and thereafter curing said resin blend in the presence of an accelerator by the action of heat.

12. A cellulose containing textile material characterized by wrinkle resistance, shrinkage control, resin finish which resists acid degradation, having cured thereon a resin composition containing dimethylol ethylene urea and a substantially fully etherified, substantially fully methylolated melamine resin present in relative mole ratios of from 1:0.75 to 1:1.25, said etherifying groups on said methylolated melamine containing from between about 0.5 to 4 ethoxyethyl groups and between about 5.5 and 2 methyl groups.

References Cited in the file of this patent

UNITED STATES PATENTS

| | | |
|---|---|---|
| 2,197,357 | Widmer et al. | Apr. 16, 1940 |
| 2,328,425 | D'Alelio | Aug. 31, 1943 |
| 2,577,767 | Jones | Dec. 11, 1951 |
| 2,690,404 | Spangler | Sept. 28, 1954 |
| 2,763,649 | Neuewelt | Sept. 18, 1956 |
| 2,802,754 | Ashby et al. | Aug. 13, 1957 |
| 2,929,798 | Wayland et al. | Mar. 22, 1960 |